(12) United States Patent
Richstein

(10) Patent No.: US 8,499,240 B2
(45) Date of Patent: Jul. 30, 2013

(54) RULE-BASED PRESENTATION OF LOG MESSAGES ON A GRAPHIC TIMELINE

(75) Inventor: Hans-Juergen Richstein, Rauenberg (DE)

(73) Assignee: SAP AG, Walldorf (DE)

( * ) Notice: Subject to any disclaimer, the term of this patent is extended or adjusted under 35 U.S.C. 154(b) by 417 days.

(21) Appl. No.: 12/262,752

(22) Filed: Oct. 31, 2008

(65) Prior Publication Data

US 2010/0115443 A1 May 6, 2010

(51) Int. Cl.
*G06F 3/00* (2006.01)
*G06F 15/177* (2006.01)
*G06F 3/048* (2006.01)
*G06F 15/173* (2006.01)

(52) U.S. Cl.
USPC ........... 715/703; 715/736; 715/764; 709/223; 710/19

(58) Field of Classification Search
USPC ................. 715/736, 771, 965, 966, 703, 764, 715/277; 709/223; 710/18
See application file for complete search history.

(56) References Cited

U.S. PATENT DOCUMENTS

| | | | | |
|---|---|---|---|---|
| 5,847,972 A | * | 12/1998 | Eick et al. | 709/246 |
| 5,872,909 A | * | 2/1999 | Wilner et al. | 714/38.12 |
| 6,098,101 A | * | 8/2000 | Sears | 709/224 |
| 6,600,501 B1 | * | 7/2003 | Israel et al. | 715/810 |
| 7,099,897 B2 | * | 8/2006 | Huras et al. | 707/648 |
| 7,424,718 B2 | * | 9/2008 | Dutton | 719/318 |
| 7,509,539 B1 | * | 3/2009 | Denefleh et al. | 714/48 |
| 7,698,686 B2 | * | 4/2010 | Carroll et al. | 717/125 |
| 7,886,202 B2 | * | 2/2011 | Lin et al. | 714/57 |
| 2006/0031719 A1 | * | 2/2006 | Bower et al. | 714/39 |
| 2007/0245238 A1 | * | 10/2007 | Fugitt et al. | 715/700 |
| 2009/0113246 A1 | * | 4/2009 | Sabato et al. | 714/37 |
| 2009/0199118 A1 | * | 8/2009 | Sabato et al. | 715/765 |

OTHER PUBLICATIONS

Potter Scott, Event Driven Timeline Displays: Beyond Message Lists in Human-Intelligent System Interaction, 1991.*

* cited by examiner

*Primary Examiner* — Nicholas Ulrich
(74) *Attorney, Agent, or Firm* — Buckley, Maschoff & Talwalkar LLC

(57) ABSTRACT

Systems, methods, computer program code, and means are provided for the rules-based presentation of log messages on a graphical timeline. Pursuant to some embodiments, a request to view log file information is received, and a plurality of log file messages are retrieved based on the request. The plurality of log file messages are aggregated based on timestamp information contained in each of the log file messages and the aggregated log file messages are displayed along a graphical timeline.

21 Claims, 4 Drawing Sheets

US 8,499,240 B2

RULE-BASED PRESENTATION OF LOG MESSAGES ON A GRAPHIC TIMELINE

FIELD

Some embodiments relate to the reading and analysis of log files. More specifically, some embodiments relate to the rules-based presentation of log file messages on a graphical timeline.

BACKGROUND

The execution of computer programs and operation of computer hardware commonly result in the generation of error and informational messages regarding the programs or hardware. These messages are commonly stored in one or more "log files" associated with a system. A common task of administrators, support staff and users in general is the reading and analysis of these log files. Analysis is required to identify, diagnose and resolve system issues.

Log files are typically packed with data including messages and time stamps. Log files are difficult to read and generally are produced in a flat file which must be scanned to identify potential issues. The presentation of entries in such files makes it difficult for a human to interpret the density or currency of entries. This can make it difficult for a human to easily identify and troubleshoot problems.

It would be desirable to provide systems and methods for improving the presentation of log files so that errors, trends and issues can be more easily perceived and identified by humans.

DETAILED DESCRIPTION

Figure 1:
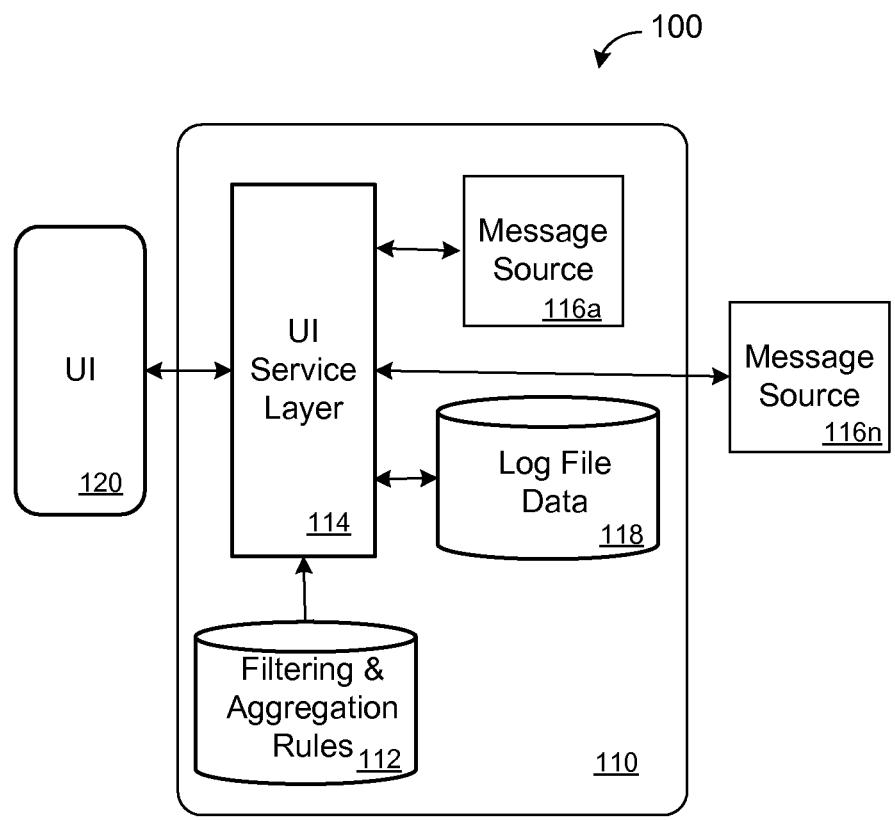
FIG. 1 is a block diagram of components to present log messages on a graphical timeline according to some embodiments.

FIG. 1 is a block diagram of system 100 according to some embodiments. System 100 includes computer system 110 and user interface 120. Generally, computer system 110 may provide log file messages displayed on a graphical timeline to user interface 120 according to some embodiments. Computer system 110 may comprise an SAP application platform based on SAP Netweaver®, but is not limited thereto. In this regard, FIG. 1 represents a logical architecture for describing processes according to some embodiments, and actual implementations may include more or different components arranged in other manners.

Computer system 110 may include or be in communication with a number of processes, devices and systems that cause the creation of log files and log data. These log files and log data are used to track, diagnose or monitor the status of the processes, devices and systems. These log file messages may be obtained from a number of different log file message sources 116a-n as is known in the art. For example, in a typical network system, log file messages may be created for processes including, for example, an overall system configuration, a TCP/IP connection status, other network connection statuses, test routines, or the like. In many systems, designers or administrators create maintenance or diagnosis routines to monitor the status of different devices or systems. For example, a critical disk storage device may be monitored using a routine that generates log files. Data from any (or all) of such log file message sources 116a-n may be used pursuant to embodiments of the present invention.

Computer system 110 is in communication with one or more data storage devices such as filtering and aggregation rules data store 112 and log file data store 118. Filtering and aggregation rules data store 112 stores data, including one or more rules, for filtering and aggregating log file data so that it can be displayed on a graphical timeline. Data store 112 is accessible by UI service layer 114. In some embodiments, for example where log file data received from one or more log file message sources 116a-n is stored for future analysis, computer system 110 is further in communication with log file data store 118 for storing or archiving log file data. Pursuant to some embodiments, UI service layer 114 may cause the access of data from log file data store 118 to display log file data on a graphical timeline (e.g., so that the data is viewable by a user operating a user interface 120 in communication with the computer system 110).

Pursuant to some embodiments, computer system 110 receives data from one or more log file message sources 116a-n in the format generated by the log file message sources 116a-n. The data is then stored in log file data store 118. Log file data is retrieved for display on a user interface 120 using one or more filtering and aggregation rules stored in data store 112. Pursuant to some embodiments, the filtering and aggregation rules may be modified by a qualified user (e.g., such as a system administrator) so that log file messages may be combined, flagged, or otherwise presented in a manner which highlights important log file events for a user. For example, pursuant to some embodiments, messages may be filtered by their relative importance and aggregated with other events on a graphical timeline so that a user interacting with a user interface 120 may readily and quickly identify important events. In some embodiments, log file messages may be aggregated based on different logical components (or systems) so that related information is displayed in a coherent manner. Examples of some embodiments will be provided further below.

A user (e.g., such as an administrator or technician) may manipulate user interface 120 to interact with UI service layer 114 according to some embodiments. Such interactions may include requesting log file message reports, viewing current system status, monitoring system information, or the like. User interface 120 may be displayed by any suitable device. For example, the device may include any necessary software to support a proprietary interface (e.g., a proprietary client application) or execution engine (e.g., a Web browser). A device to display the user interfaces is capable of communication (including sporadic communication—e.g., mobile devices) with computer system 110.

Figure 2:
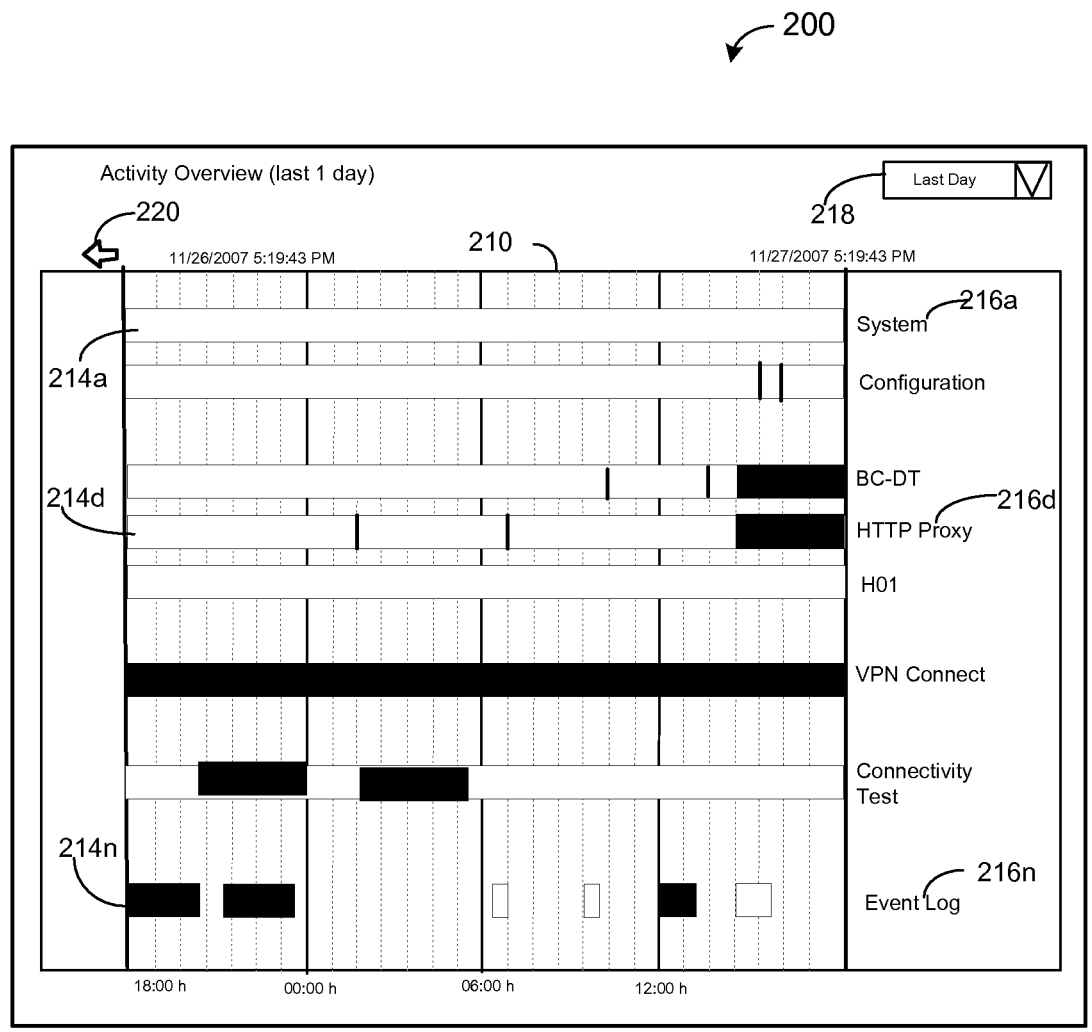
FIG. 2 is a view of a user interface for viewing log files on a graphical timeline according to some embodiments.

FIG. 2 illustrates a user interface 200 according to some embodiments. A user (e.g., such as a system administrator or technician) may access user interface 200 through a user interface adaptation dialog provided by UI service layer 114. User interface 200 allows the user to view, access, and interact with log file message data in a graphical timeline pursuant to embodiments of the present invention.

As shown, user interface 200 includes an area 210 which displays a number of items of information in a graphical timeline. In the illustrative interface, the timeline is shown as extending horizontally, from left to right. Those skilled in the art will appreciate that other formats may also be used. In the illustrative interface, area 210 includes two primary portions, a set of data tracks 214a-n and a corresponding set of monitored components 216a-n. Each data track 214 provides a graphical illustration of the status of the corresponding monitored component 216. Pursuant to some embodiments, the data tracks 214 are color coded to reflect different statuses. For example, color codes may be selected to draw attention to those events or statuses which require attention (e.g., error or failure messages may be coded in red, satisfactory statuses may be coded in green, and warnings may be coded in yellow).

Each of the data tracks 214 are constructed using aggregated and filtered log file message data. For example, the data track 214d (associated with a monitored component 216d labeled as the "HTTP Proxy" component) may be constructed from a number of different log file messages received from a monitoring program associated with the HTTP Proxy component. For example, the monitoring program associated with the HTTP Proxy component may check the status of the HTTP Proxy component every minute (or some other frequency) and generate a log file message indicating the status of the HTTP Proxy component. Data track 214d may, thus, represent hundreds of individual log file messages associated with the HTTP Proxy component. As shown, for most of the displayed time period, the HTTP Proxy component was operating properly (or, put another way, the status of the HTTP Proxy component was in an acceptable state). However, at several points in time, the log file of the HTTP Proxy component included messages indicating the HTTP Proxy component was not in an acceptable state (shown in FIG. 2 as black lines in data track 214d).

Embodiments of the present invention allow these status changes (particularly status changes which indicate an unacceptable or undesirable status) to be quickly perceived by a human operator. Pursuant to some embodiments, an operator may move, position or hover a cursor or other pointer over the area to obtain more details (an example will be provided further below in conjunction with a discussion of FIG. 3).

Each of the data tracks 214 may be constructed using log file data that is filtered and/or aggregated pursuant to one or more rules (e.g., from filtering and aggregation rules datastore 112 of FIG. 1). For example, in the user interface 200 depicted in FIG. 2, the top-most track 214a (associated with the component labeled "System" 216a) may be constructed from data from a number of different log files selected to provide an overall or aggregated view of multiple data sources. Such an aggregation of data may, for example, be used to provide an operator with an overall understanding of the status of a group of components at a particular point in time (in this example, the group of components is selected to represent the overall status of a computer system).

Embodiments of the present invention allow a variety of different filters and aggregations to occur. For example, filtering and aggregation rules may be created and stored in data store 112 of FIG. 1 which define specific events of special interest that are obtained from one or more log file message sources. The specific events may be filtered and aggregated to effectively pre-interpret data to illustrate an overall state of the components. As a simple example, an aggregation rule may be defined using Boolean logic such as the following: the overall status of the system is acceptable (or "OK") if component A has a status of "OK" and if components B and C have a status of "OK" or "Warning". A series of such aggregation rules may be defined so that a user may quickly and efficiently diagnose and monitor the status of individual components and an overall system or process.

Other data tracks 214 shown in FIG. 2 may be constructed using data from a single log file message source. For example, the data track 214d may be constructed from log file message data from a single monitoring program that is configured to monitor the status of a particular HTTP Proxy connection. In this way, a user interacting with user interface 200 may quickly view the status of the HTTP Proxy connection at various points in time. If an undesirable status is seen, the user may quickly and efficiently navigate to view the log file messages associated with the point in time at which the HTTP Proxy connection entered the undesirable state. Unlike previous log file monitoring systems, the user does not need to scan or page through hundreds (if not thousands) of lines of status data.

User interface 200 may include other tools to allow a user to easily navigate through log file data. For example, as shown, a user may select a date range using interface item 218. The interface item 218 is shown as a drop-down box in which the "last day" of log file graphical data is shown. Those skilled in the art will appreciate that users may be prompted to select time or date ranges in a number of ways so that a user may easily navigate data by time. For example, a user may select to view the last hour of activity, providing track data 214 having a greater degree of granularity. As another example, a user may select to see a week's worth of activity so that the user may readily identify potential error or other system or component trends. As shown, user interface 200 also includes one or more icons 220 allowing the user to scroll through data based on time or date. For example, as shown, where the user is viewing data from the last day of activity, scrolling to the left may reveal the previous day or hour's worth of log file activity. Again, this allows a user to quickly and readily assess trends and issues.

Figure 3:
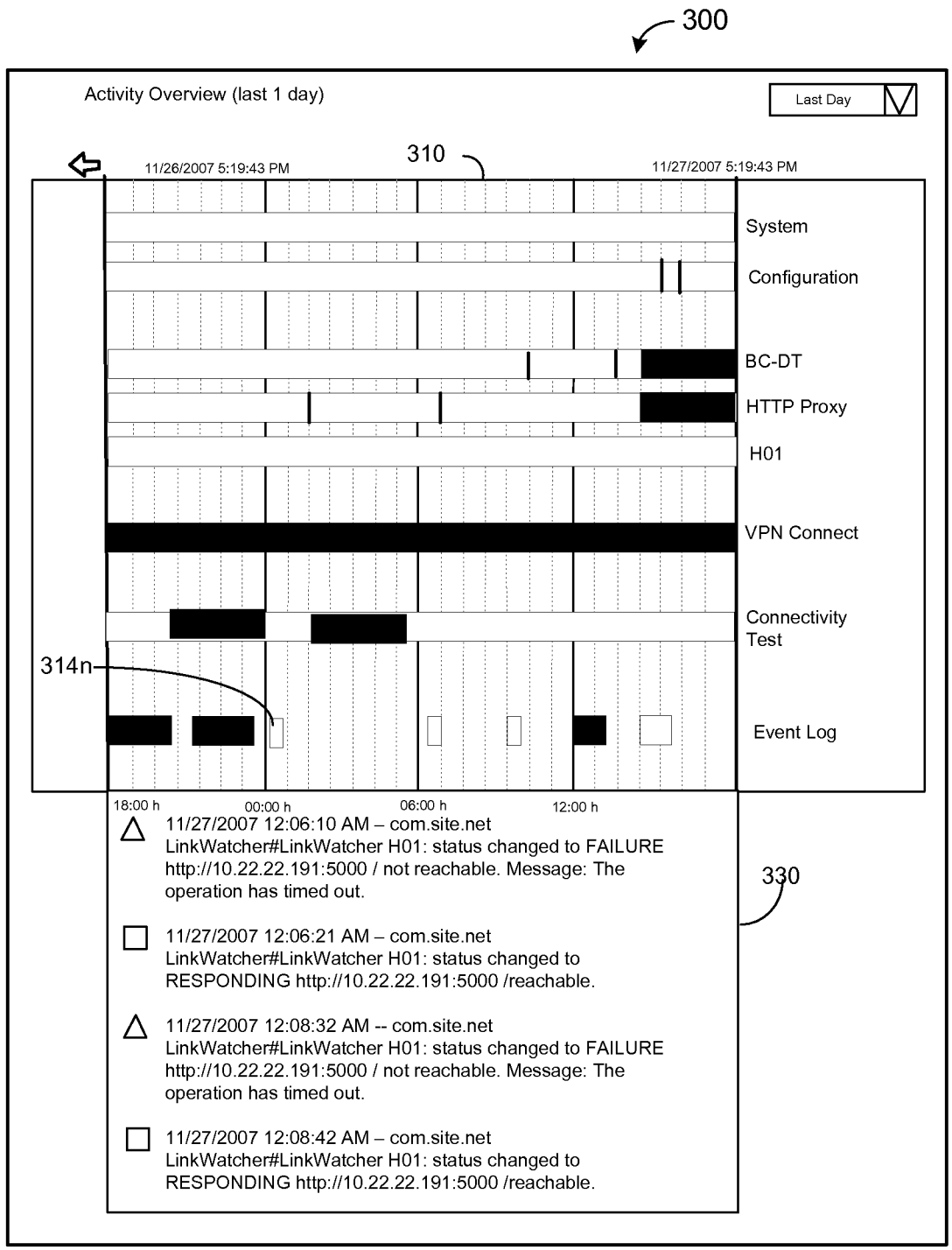
FIG. 3 is another view of a user interface according to some embodiments.

Reference is now made to FIG. 3 where a further user interface 300 is shown. User interface 300 includes two portions, a top portion 310 and a bottom portion 330. The top portion 310 is similar to the screen 210 of FIG. 2 and displays similar data. The bottom portion 330 represents a user interface that may be displayed when a user, operating a mouse or other pointer device, selects (or hovers over, or clicks, etc.) a particular point in time on a particular track of data (such as, for example, track 314n). That is, the user has selected to view the actual log message data for a particular point in time for a particular component (in this example, the user has selected to view log file message data from 11/27/2007 at 12:06:10 AM for the "SAP Event Log" component). Pursuant to some embodiments, when a user selects a particular portion of a data track 314, log file message data associated with that component and that time period is presented in a screen portion 330 so that the user can view the actual status information generated at that time. This allows the user to more accurately diagnose or trouble shoot issues or trends.

The screen portion 330 illustrates the data fields that may be provided by a message source (such as a message source 116 of FIG. 1) in a log file. For example, as shown, each item in a log file may include data representing a time and date, a component name or reference, a message source identifier or name, a status, and a status message. Those skilled in the art will appreciate that other or additional data may also be included. Some or all of these data items may be subject to one or more filtering and/or aggregation rules to present the log file message information on a graphical timeline as shown, for example, in FIGS. 2 and 3.

Visual cues and icons may also be presented in screen portion 330 to further assist users in quickly analyzing the presented data. For example, a triangle image may be added to a message when the message is associated with a status condition of "FAILURE", while a square image may be added to messages that are associated with a status condition of "RESPONDING". Other images or icons, including color coded images or icons, may be selected and appended to message data as desired.

Figure 4:
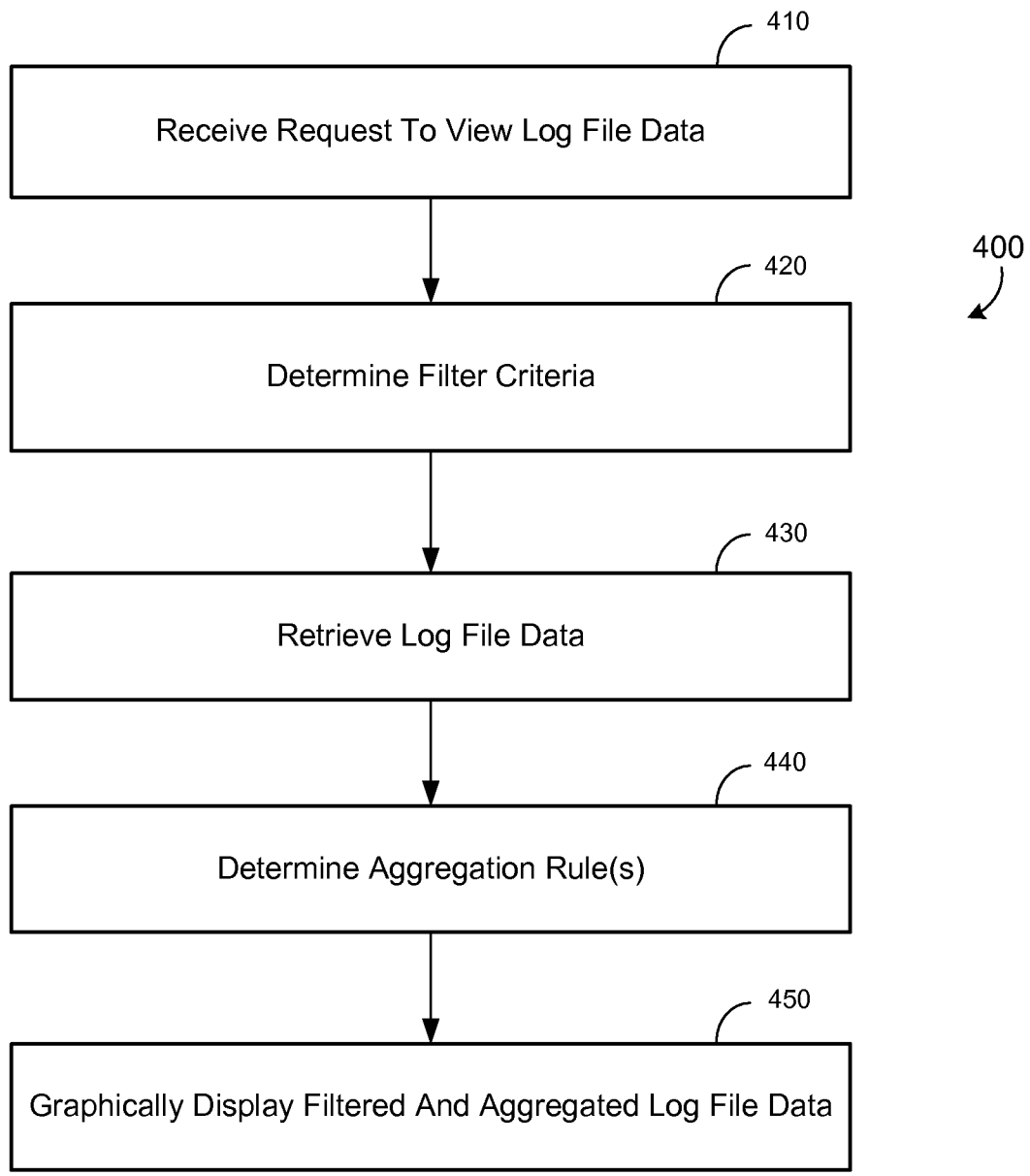
FIG. 4 is a flow diagram of a process according to some embodiments.

FIG. 4 is a flow diagram of a process 400 to display log file data on a graphical timeline pursuant to some embodiments. Process 400 may be, for example, executed by the computer system 110 of FIG. 1 in response to a request for data received from a user interface such as user interface 120 of FIG. 1. Process 400 may be executed by systems differing from system 110, and system 110 is not limited to the execution of process 400.

The process 400 begins at 402 where a request to view log file data is received. The request at 402 may be received by system 110 of FIG. 1 from a user operating a user interface such as the interface 120 of FIG. 1. The request to view log file data may be initiated by a user pointing a browser associated with the user interface to a network address associated with system 110. The request is received by computer system 110 and processed, for example, by UI service layer 114.

As part of processing the request, any filter information associated with the request is identified (at 420). For example, the request may include information identifying a view or parameters associated with the particular log file data to be viewed. As a particular example, the request may include information identifying a time period over which to view the log file data (e.g., such as the last hour, the last 24 hours, the last week, etc.). At 420, this filter information or criteria are processed in order to retrieve the requested data. The requested information may be retrieved, for example, using code configured to extract the data from a data store such as data store 118 of FIG. 1. As a specific example, the requested information may be retrieved by creating a database query which includes the filter criteria identified at 420.

Processing continues at 430 where the log file data which matches the filter criteria is retrieved. As an example, if the filter criteria included a specification of a date range, the log file data matching the date range filter is retrieved at 430. As an example, the data may be retrieved using a database query to retrieve filtered data from a datastore such as the datastore 118 of FIG. 1. A number of different filters may be applied at 420 to retrieve particular data at 430. For example, a date range filter may be applied in conjunction with a component filter or the like to retrieve specific data for presentation on a graphical timeline.

Processing continues at 440 where one or more aggregation rule(s) are determined. For example, pursuant to some embodiments, aggregation rules which define particular components or component groups may be applied to aggregate multiple log file messages for presentation. Referring to the illustrative user interface of FIG. 2, for example, aggregation rules which specify the different log file message source data which makeup the "System" component are applied to aggregate message data from multiple sources into a single, easy to analyze and view data track. A number of such aggregation rules may be applied to group data in different ways, thereby allowing quick and easy analysis by a user. Other aggregation rules may also be applied at 440. For example, events from log file messages occurring at the same point in time are also aggregated to produce data tracks as shown in FIG. 2. As another example, status information from different log file messages may be grouped using logical expressions to create an aggregate status of each component at a particular point in time. The aggregation rules applied at 440 may be applied at UI service layer 114 (of FIG. 1) prior to transmission to a user interface.

Processing continues at 450 where the filtered and aggregated data is displayed on a user interface, such as the user interface 120 of FIG. 1. Pursuant to some embodiments, the filtered and aggregated data is presented on a user interface in a screen such as the screen shown in FIG. 2. For example, the data may be presented with multiple data tracks corresponding to multiple components or component groups. In some embodiments, JavaScript or other client-side scripting language is used to allow fast data retrieval from the client interface. For example, as shown in FIG. 2, a user may change filter parameters by simply hovering or clicking a pointer device over a particular spot on the screen (e.g., such as a particular point in time on a data track). By doing so, a client request is initiated (e.g., using JavaScript or the like) requesting a new set of data from the system 110. In some embodiments, the updated data request causes process 400 to repeat (e.g., the updated data request is a request to view log file data as shown at step 410 of FIG. 4). The process can repeat as needed while a user views and analyzes log file data.

In this manner, embodiments permit a user operating a user device to quickly and efficiently analyze and view log file data without the need to page through large amounts of difficult to read data records. Users, pursuant to some embodiments, may simply navigate through screens containing filtered and aggregated log file message data shown on a graphical timeline.

Each system described herein may be implemented by any number of devices in communication via any number of other public and/or private networks. Two or more of devices of may be located remote from one another and may communicate with one another via any known manner of network(s) and/or a dedicated connection. Moreover, each device may comprise any number of hardware and/or software elements suitable to provide the functions described herein as well as any other functions. Other topologies may be used in conjunction with other embodiments.

All systems and processes discussed herein may be embodied in program code stored on one or more computer-readable media. Such media may include, for example, a floppy disk, a CD-ROM, a DVD-ROM, a Zip™ disk, magnetic tape, and solid state RAM or ROM memories. Embodiments are therefore not limited to any specific combination of hardware and software.

The embodiments described herein are solely for the purpose of illustration. Those in the art will recognize other embodiments may be practiced with modifications and alterations limited only by the claims.

What is claimed is:

1. A method comprising:
receiving a request to view log file information;
retrieving, based on said request, a plurality of log file messages associated with a plurality of components, at least some of said plurality of log file messages from multiple different sources and at least some of said plurality of log file messages being associated with a plurality of different system components comprising a system;
aggregating, according to at least one aggregation rule related to a status of the plurality of components, at least two of said plurality of log file messages from multiple different sources based on said at least one aggregation rule and on timestamp information contained in each of said log file messages from said multiple different sources;
determining an overall status of said system based on the aggregated log file messages and the at least one aggregation rule, the at least one aggregation rule comprising at least one Boolean expression relating to the statuses of said plurality of components of said system;

generating a graphical data track based on the aggregated log file messages and the determined overall status of said system, the graphical data track including a visual indication of an overall status of said system; and causing said graphical data track to be displayed along a graphical timeline, said graphical timeline providing the overall status of said system, and wherein the graphical timeline includes a set of graphical data tracks for said multiple data sources and a corresponding set of said components relating to said set of graphical data tracks, where each of said graphical data tracks comprises aggregated and filtered log file messages.

2. The method of claim 1, further comprising determining at least a first filter rule associated with said request, wherein said retrieving further comprises:

retrieving log file messages matching said at least first filter rule.

3. The method of claim 2, wherein said at least first filter rule identifies at least one of: a desired source of said log file messages, a timestamp of said log file messages, a status of said log file messages, and an error severity of said log file messages.

4. The method of claim 1, wherein said request is received from a user device and said graphical timeline is displayed on said user device.

5. The method of claim 1, further comprising:

receiving a second request to view log file information, said second request based on said display of said graphical data track along said graphical timeline.

6. The method of claim 5, wherein said second request is a request to view details of said graphical data track at a specific time.

7. The method of claim 6, further comprising:

retrieving, based on said second request, at least a first log file message; and causing said at least first log file message to be displayed simultaneously as and without obscuring said graphical timeline.

8. The method of claim 1, further comprising:

aggregating, according to at least a second aggregation rule, at least some of said plurality of log file messages from one source of said multiple sources based said at least second aggregation rule and on timestamp information contained in each of said log file messages from said one source; and causing said aggregated log file messages from said one source to be displayed along a graphical timeline in a data track.

9. The method of claim 1, wherein the visual indication of the overall status of said system included in the graphical data tracks comprises at least two colors, each color corresponding to different state of said system.

10. A system comprising:

at least one processor; a plurality of different log file data sources, each of said different log file data sources producing a log file containing a plurality of log file messages associated with a current status of an associated component of said system;

a log file data store, storing said plurality of log file messages from said plurality of log file data sources; and a service layer to:

receive a request to view log file information;

retrieve a plurality of log file messages from said plurality of different log file data sources from said log file data store based on filtering rules associated with said request to view log file information;

aggregate, according to at least one aggregation rule related to a status of said associated components, at least two of said retrieved plurality of log file messages from said plurality of different log file data sources based on said at least one aggregation rule and timestamp information contained in each of said log file messages from said plurality of different sources;

determine an overall status of said system based on the aggregated log file messages and the at least one aggregation rule, the at least one aggregation rule comprising at least one Boolean expression relating to the statuses of said plurality of components of said system;

generate a graphical data track based on the aggregated log file messages and the determined overall status of said system, the graphical data track including a visual indication of an overall status of said system; and cause said graphical data track to be displayed along a graphical timeline said graphical timeline providing the overall status of said system, wherein said graphical timeline includes a set of graphical data tracks for said plurality of log file data sources and a corresponding set of components relating to said set of graphical data tracks, where each of said graphical data tracks comprises aggregated and filtered log file messages.

11. The system of claim 10, further comprising:

a user device in communication with said service layer, said user device displaying said log file messages simultaneously as and without obscuring said graphical timeline.

12. The system of claim 10, wherein the visual indication of the overall status of said system included in the graphical data tracks comprises at least two colors, each color corresponding to different state of said system.

13. An apparatus, comprising:

a processor; and a storage device in communication with said processor and storing instructions adapted to be executed by said processor to:

receive a request to view log file information;

retrieve, based on said request, a plurality of log file messages associated with a plurality of components, at least some of said plurality of log file messages from multiple different sources and at least some of said plurality of log file messages being associated with a plurality of different system components comprising a system;

aggregate, according to at least one aggregation rule related to a status of said plurality of components, at least two of said plurality of log file from multiple different sources based on said at least one aggregation rule and on timestamp information contained in each of said log file messages from said multiple different sources;

determine an overall status of said system based on the aggregated log file messages and the at least one aggregation rule, the at least one aggregation rule comprising at least one Boolean expression relating to the statuses of said plurality of components of said system;

generate a graphical data track based on the aggregated log file messages and the determined overall status of said system, the graphical data track including a visual indication of an overall status of said system; and cause said graphical data track to be displayed along a graphical timeline, said graphical timeline providing a set of graphical data tracks for said multiple data sources and a corresponding set of said components relating to said set of graphical data tracks, where each of said graphical data tracks comprises aggregated and filtered log file messages.

14. The apparatus of claim 13, wherein said storage device further stores instructions adapted to be executed by said processor to determine at least a first filter rule associated with said request, said instructions to retrieve further adapted to be executed by said processor to retrieve a plurality of log file messages matching said at least first filter rule.

15. The apparatus of claim 14, wherein said at least first filter rule identifies at least one of: a desired source of said log file messages, a timestamp of said log file messages, a status of said log file messages, and an error severity of said log file messages.

16. The apparatus of claim 13, wherein said request is received from a user device and said graphical timeline is displayed on said user device.

17. The apparatus of claim 13, wherein said storage device further stores instructions adapted to be executed by said processor to receive a second request to view log file information, said second request based on said display of said graphical data track along said graphical timeline.

18. The apparatus of claim 17, wherein said second request is a request to view details of said graphical data track at a specific time.

19. The apparatus of claim 18, wherein said storage device further stores instructions adapted to be executed by said processor to:

retrieve, based on said second request, at least a first log file message; and cause said at least first log file message to be displayed simultaneously as and without obscuring said graphical timeline.

20. The apparatus of claim 13, wherein said storage device further stores instructions adapted to be executed by said processor to:

aggregate, according to at least a second aggregation rule, at least some of said plurality of log file messages from one source of said multiple sources based said at least second aggregation rule and on timestamp information contained in each of said log file messages from said one source; and cause said aggregated log file messages from said one source to be displayed along a graphical timeline in a data track.

21. The apparatus of claim 13, wherein the visual indication of the overall status of said system included in the graphical data tracks comprises at least two colors, each color corresponding to different state of said system.

* * * * *